United States Patent
Lee

(10) Patent No.: US 7,075,587 B2
(45) Date of Patent: Jul. 11, 2006

(54) VIDEO DISPLAY APPARATUS WITH SEPARATE DISPLAY MEANS FOR TEXTUAL INFORMATION

(75) Inventor: Chulhee Lee, Goyang (KR)

(73) Assignee: Industry-Academic Cooperation Foundation Yonsei University, Seoul (KR)

( * ) Notice: Subject to any disclaimer, the term of this patent is extended or adjusted under 35 U.S.C. 154(b) by 635 days.

(21) Appl. No.: 10/035,134

(22) Filed: Jan. 4, 2002

(65) Prior Publication Data

US 2003/0128296 A1    Jul. 10, 2003

(51) Int. Cl.
*H04N 5/445* (2006.01)
(52) U.S. Cl. ...................... 348/563; 348/589
(58) Field of Classification Search ............... 348/569, 348/589, 563, 600, 564, 588, 598, 722, 725, 348/383, 468, 739; 725/32, 35, 36, 37, 39, 725/40, 43; 345/1.1, 1.2, 1.3; H04N 5/445, H04N 5/50
See application file for complete search history.

(56) References Cited

U.S. PATENT DOCUMENTS 5,570,944 A * 11/1996 Seder et al. .................. 353/98
5,734,436 A * 3/1998 Abe et al. .................... 348/564
5,946,046 A * 8/1999 You et al. .................... 348/468
6,064,376 A * 5/2000 Berezowski et al. .......... 725/42
6,407,776 B1 * 6/2002 Sekimoto et al. ........... 348/553
6,816,201 B1 * 11/2004 Fang et al. ................. 348/468

FOREIGN PATENT DOCUMENTS

WO       WO 01/86350 A1 * 11/2005

* cited by examiner

Primary Examiner—Sherrie Hsia

(57) ABSTRACT

A video display apparatus with separate display means is provided so that the textual information can be displayed without preventing viewers from watching the full picture. The separate display means can be provided for a television receiver so that textual information, which includes closed caption text and subtitles, can be displayed on the separate display means without occupying the picture area. The separate display means can be provided for a screen in a movie theater so that subtitles can be displayed on the separate display means when a foreign movie is played. The separate display unit can be used to display other textual information, including a channel number, a name of the broadcasting station, the title of the current program and the remaining time of the current program. Furthermore, the separate display unit can display information on a local weather and a local time.

5 Claims, 30 Drawing Sheets

VIDEO DISPLAY APPARATUS WITH SEPARATE DISPLAY MEANS FOR TEXTUAL INFORMATION

BACKGROUND OF THE INVENTION

1. Field of the Invention

This invention relates to a video display apparatus that has separate display means for textual and other visual information and methods that utilize such separate display means.

2. Description of the Related Art

In television programs, there are many circumstances in which textual information needs to be displayed. For example, there is closed caption text that is broadcast for hearing-impaired people. If a viewer enables the closed caption option, the television receiver displays the closed caption text on the monitor. However, the text usually occupies a substantial portion of the picture so that viewers cannot enjoy the full picture.

In many cases, broadcasting stations broadcast foreign programs. If the foreign programs are broadcast in their original languages, a translation is typically provided in the form of text, which is usually displayed at the bottom of the picture. As with the closed caption text, this text blocks a substantial portion of the picture, thereby preventing viewers from watching the full picture.

Currently, many movies are available in the form of videocassettes, CDROM, DVD (Digital Video Data), etc. Quite often, these movies are foreign and distributors usually insert textual translation into the video signals. Consequently, this textual translation occupies a substantial portion of the picture and prevents viewers from watching the full picture. When movies are recorded as videocassettes, the textual translation becomes a part of the video signals. However, in the case of DVDs, the textual translation is recorded separately from the video signals and the viewer has the option of turning off the textual translation. However, if the viewer does not understand the foreign language and the viewer's language is not provided, then the viewer has no choice but to turn on the textual translation option. In some cases, the viewer wants to learn a foreign language and watch a movie in the foreign language. With DVD, it is possible to display the original text in the original language. Even in this case, the text blocks a substantial portion of the picture and prevents viewers from watching the full picture.

When a foreign movie is shown in a movie theater, textual translation is usually shown on the screen. Typically, the textual translation is directly written onto the film. As with television receiver, this translation blocks a substantial portion of the screen and prevents viewers from watching the full picture.

Thus, there is a need for a video display apparatus that can display textual information without blocking a part of the video.

SUMMARY OF THE INVENTION

Thus, it is an object of the present invention to provide separate display means for a video display apparatus so that textual information can be displayed in the separate display means. As a result, the viewer can enjoy the full picture.

It is another object of the present invention to provide broadcasting methods that utilize such separate display means, so that textual and auxiliary information can be effectively displayed on the separate display unit while the full picture is displayed on the video display area.

The other objects, features and advantages of the present invention will be apparent from the following detailed description.

DESCRIPTION OF THE ILLUSTRATED EMBODIMENTS

Embodiment 1

There are many circumstances in which the television receiver needs to display textual information, such as closed caption text or the textual translation of foreign movies. Sometimes, a viewer wants to learn a foreign language and watch a movie in the foreign language. With DVD, it is possible to display the original text in the original language. However, when such text is displayed, it occupies a substantial portion of the picture and the viewer cannot enjoy the full picture. In order to solve this problem, the present invention provides separate display means for a television receiver so that the textual information can be displayed in the separate display means without occupying the picture area. As a result, the viewer can enjoy the full picture while obtaining information from the text displayed in the separate display means.

Figure 29:
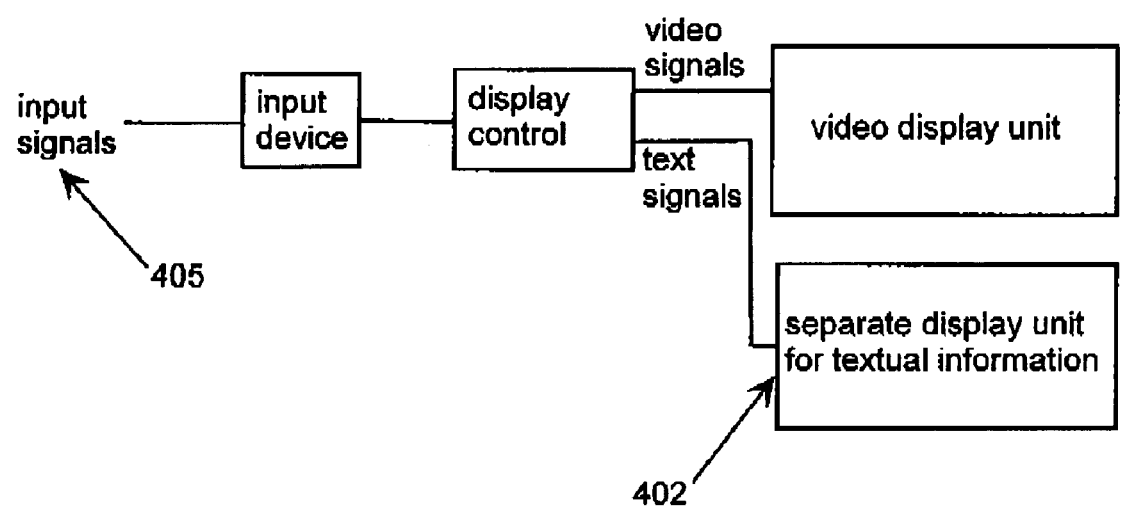
FIG. 29 shows how input signals are separated into video and text signals so that the video signals are sent to the video display unit and the text signals are sent to the separate display unit.

In order to display the textual information in the separate display means 402, the television receiver needs to separate the textual information from the input signals 405 that include video signals, audio signals, text signals, and control signals (FIG. 29). If the textual information is inseparably inserted into the video signals as in the case videocassettes, it will be difficult to extract the textual information. However, there are many other cases in which text signals are separately mixed with video signals. For instance, the text signal can be in the form of closed caption text, or it can be stored as separate images, as in the case of DVD. If the text information is in the form of closed caption text, the television receiver can easily separate the text signals from the input signals, and then display them in the separate display means. If the input signals come from a DVD player, then the textual information that is stored as separate images can be easily extracted and displayed in the separate display means. For instance, once the text signals are extracted, they can be sent to the separate display unit as bitmap using a different cable.

Figure 1:
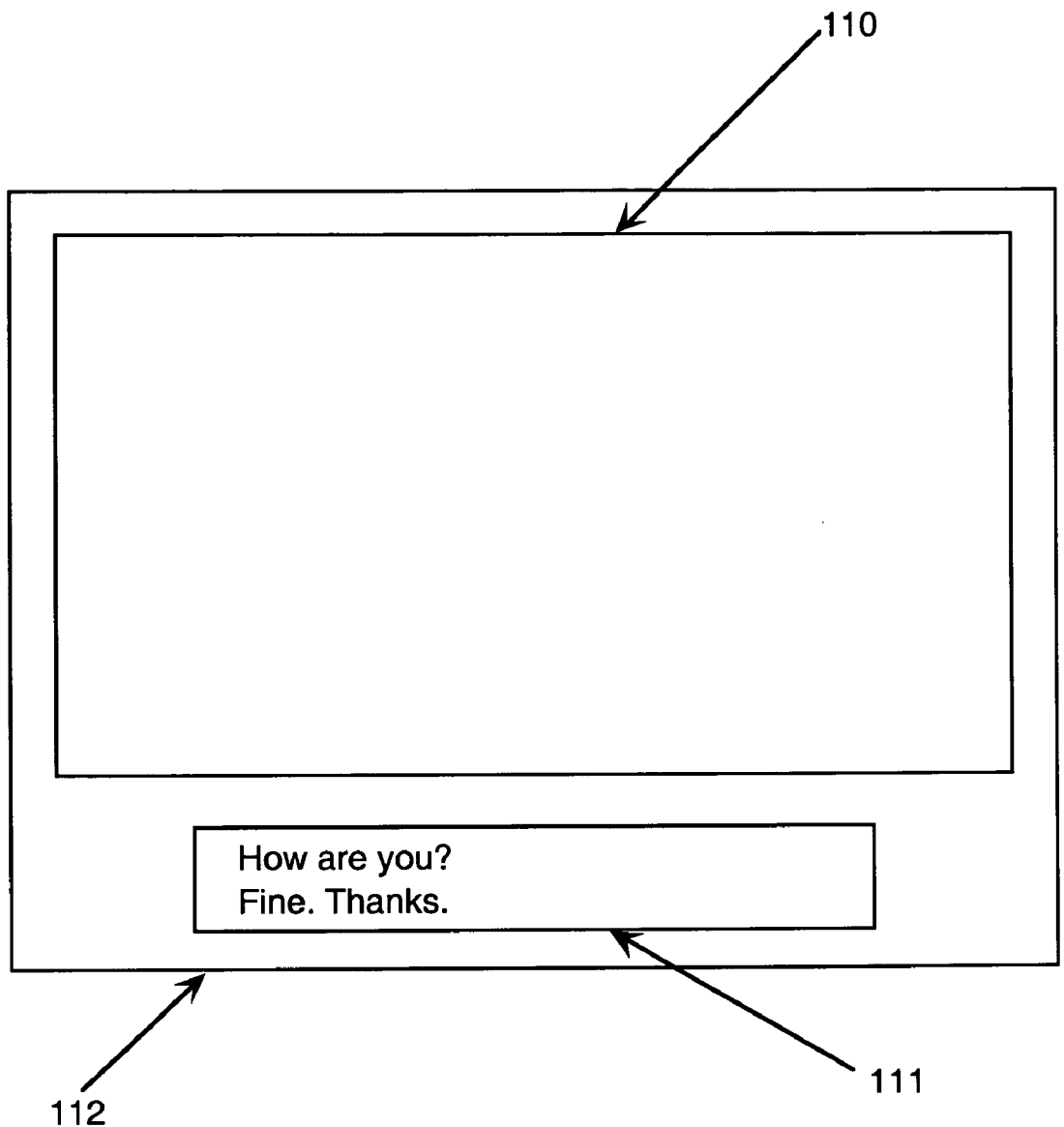
FIG. 1 shows an example of a television receiver that has a separate display unit for textual and other visual information.

FIG. 1 shows an example of a television receiver that has a separate display means for textual information. The television receiver 112 has a video display area 110 for video and a separate display means 111 for textual information.

Figure 5:
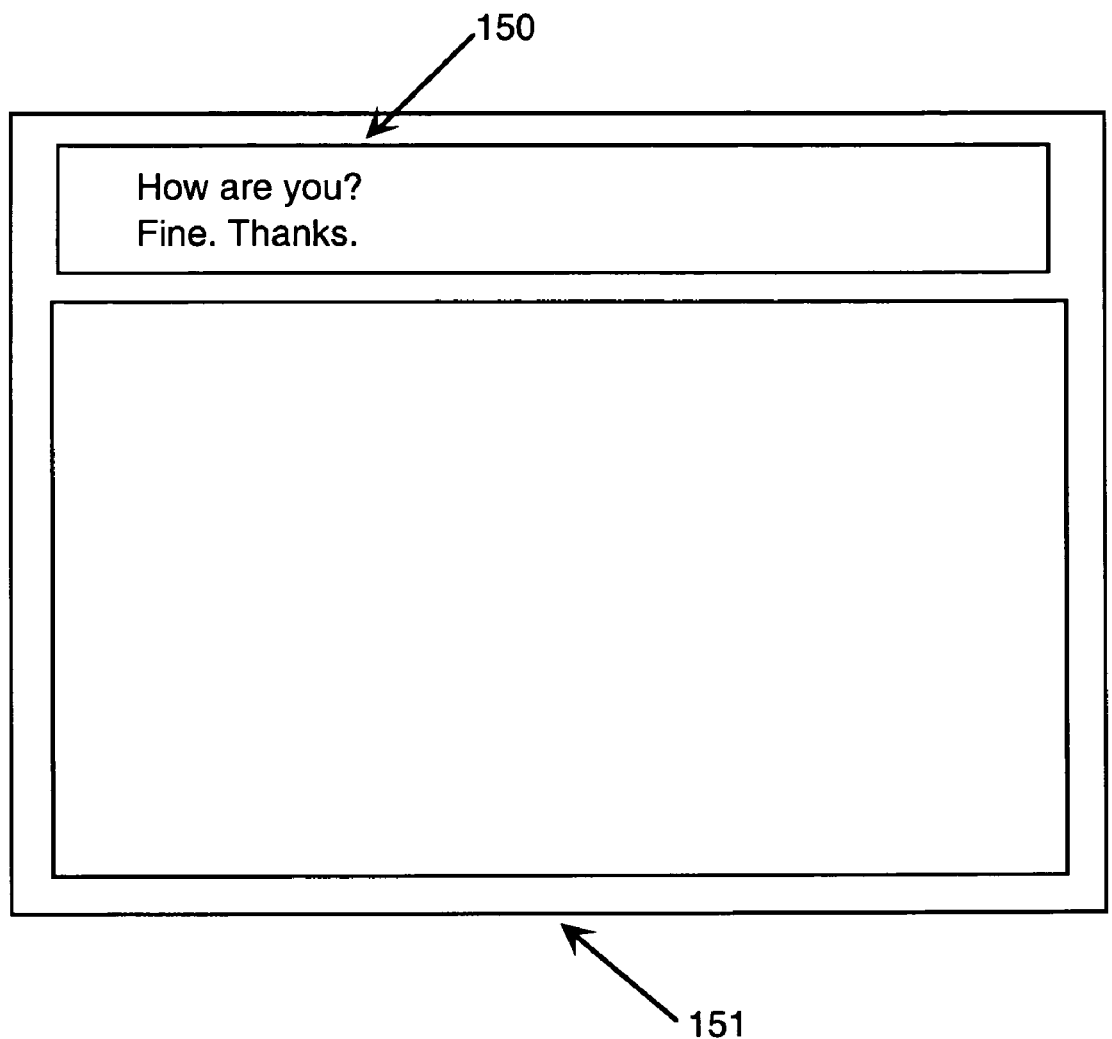
FIG. 5 shows an example of a television receiver with a separate display unit located in the upper part of the television receiver.
Figure 6:
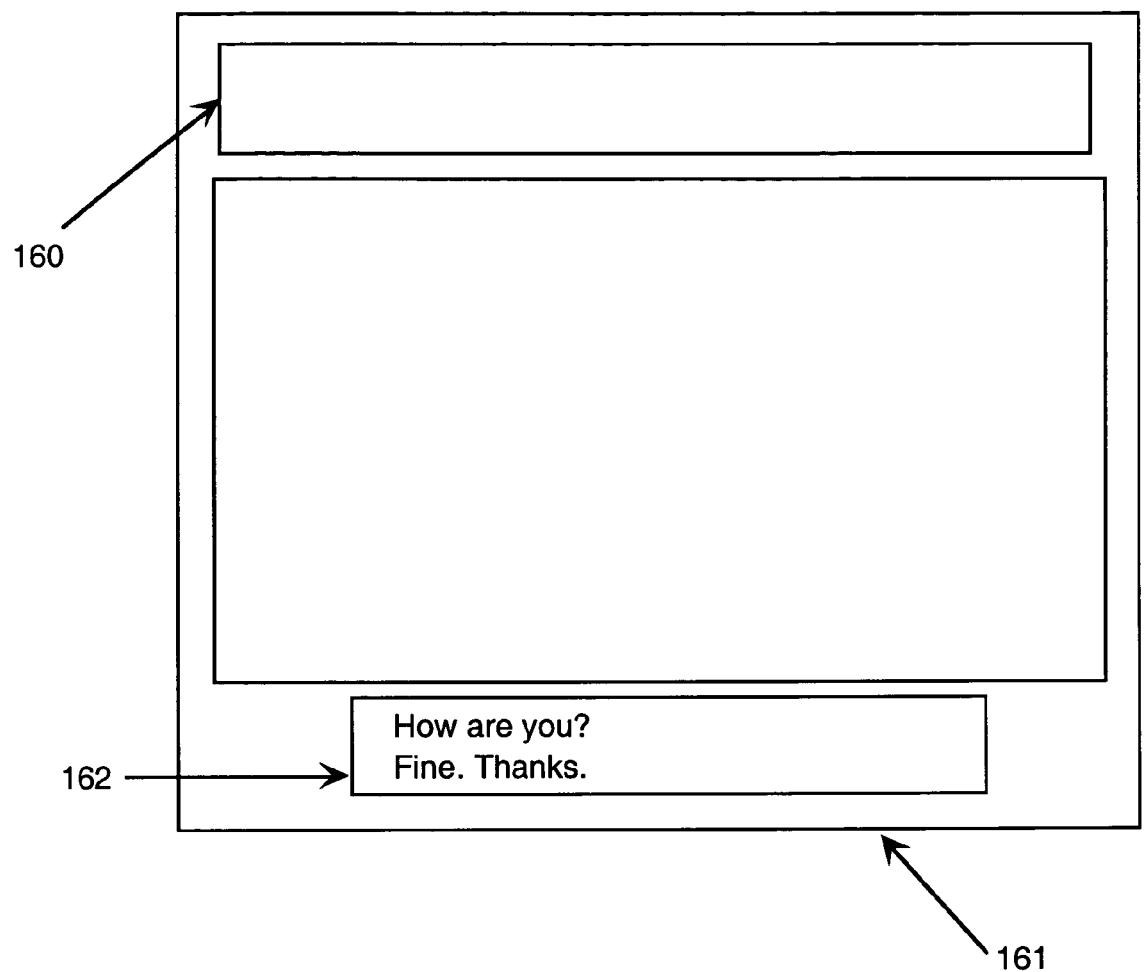
FIG. 6 shows an example of a television receiver that has two separate display units located in the upper and lower parts of the television receiver.
Figure 7:
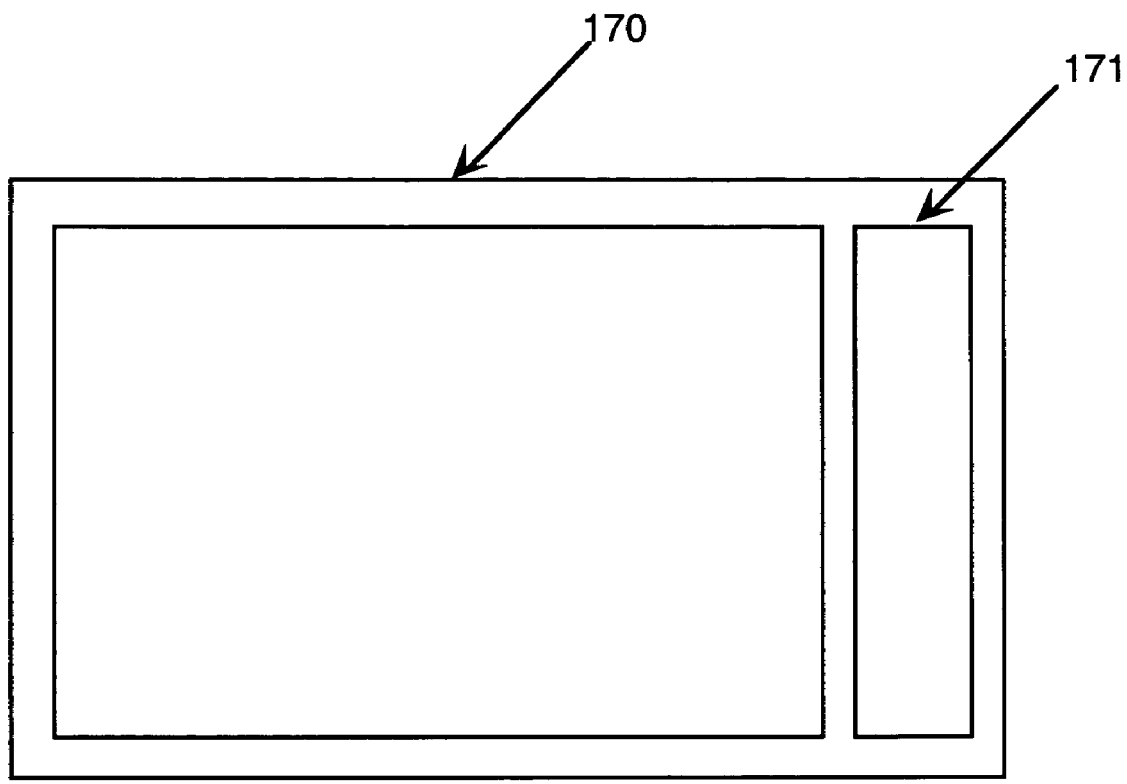
FIG. 7 shows an example of a television receiver that has a vertical separate display unit located in the right side of the television receiver.
Figure 8:
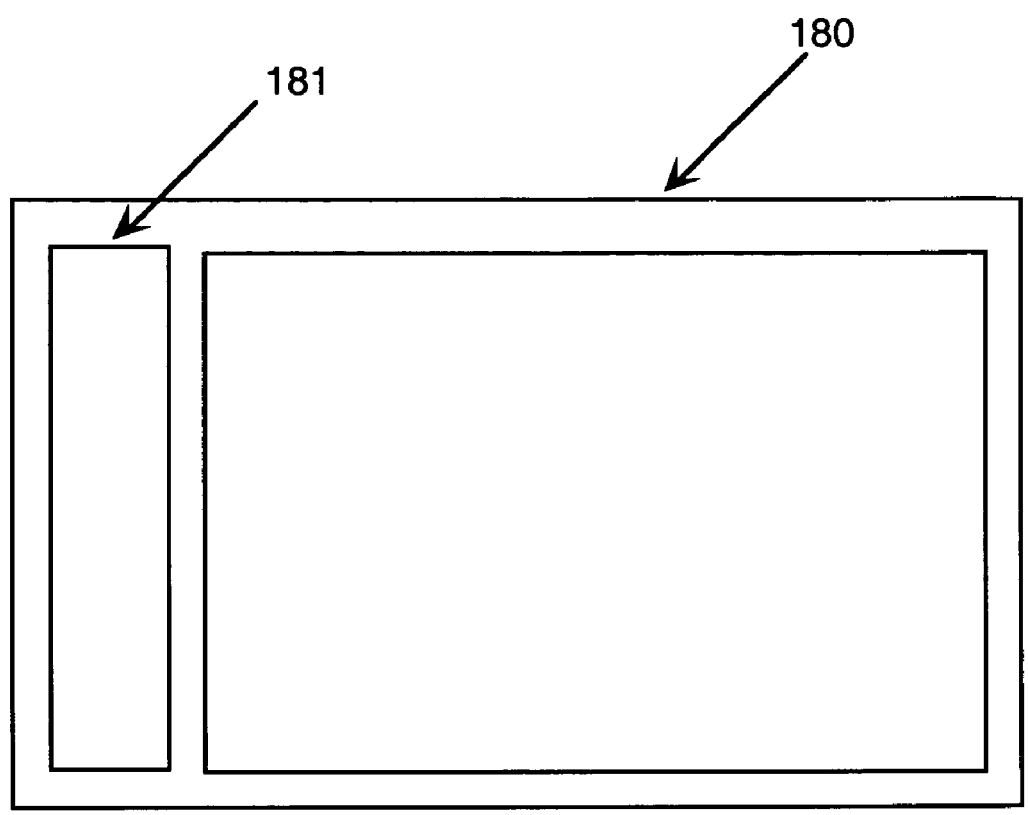
FIG. 8 shows an example of a television receiver that has a vertical separate display unit located in the left side of the television receiver.
Figure 9:
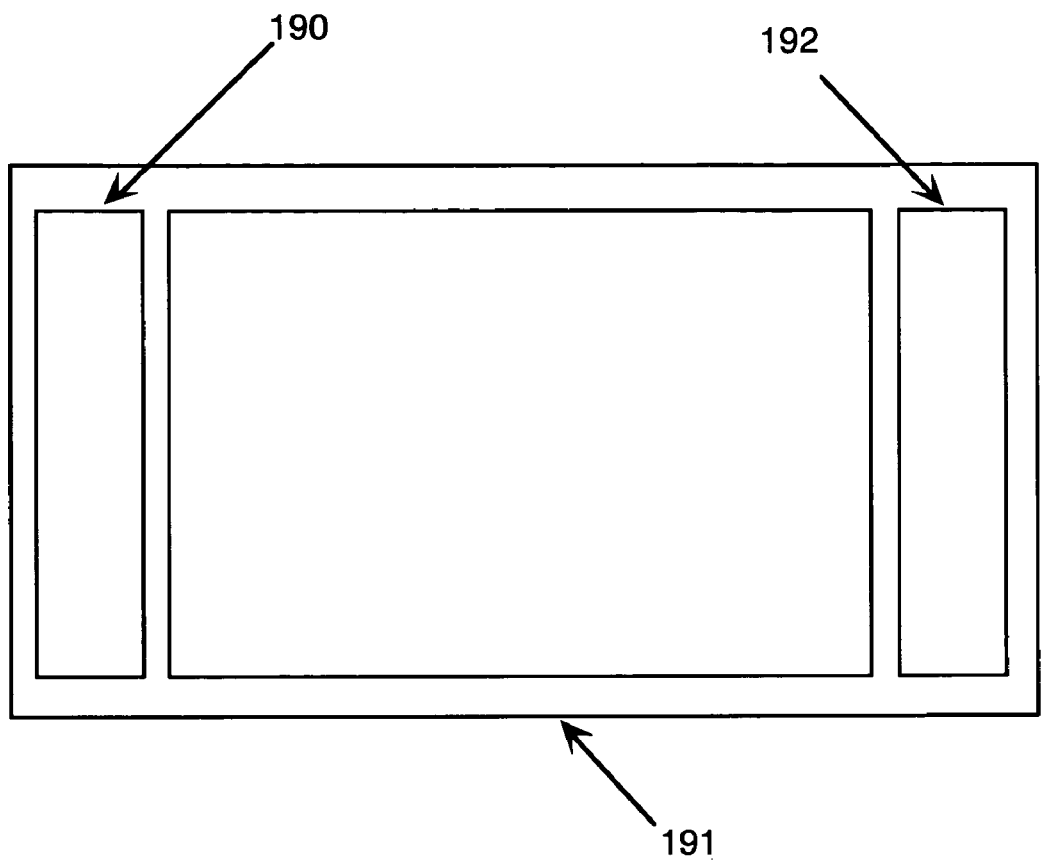
FIG. 9 shows an example of a television receiver that has two vertical separate display units located in both sides of the television receiver.

The location of the separate display means may be anywhere outside of the video display area 110. In the case of television receivers, the separate display means 150 can be placed in the upper part of the television receiver 151 (FIG. 5). As illustrated in FIG. 1, it can also be located in the lower part of the television receiver 112. Some languages can be written vertically. In such cases, the separate display means 171 can be located vertically in the right side of the television receiver 170 (FIG. 7). Alternatively, the separate display means 181 can be located on the left side of the television receiver 180 (FIG. 8). Since the separate display unit can be used for various applications, it may be useful for the television receiver to have multiple separate display units (FIG. 6 and FIG. 9). The television receiver 161 in FIG. 6 has two horizontal separate display units 160, 162. The television receiver 191 in FIG. 9 has two vertical separate display units 190, 192.

Figure 2:
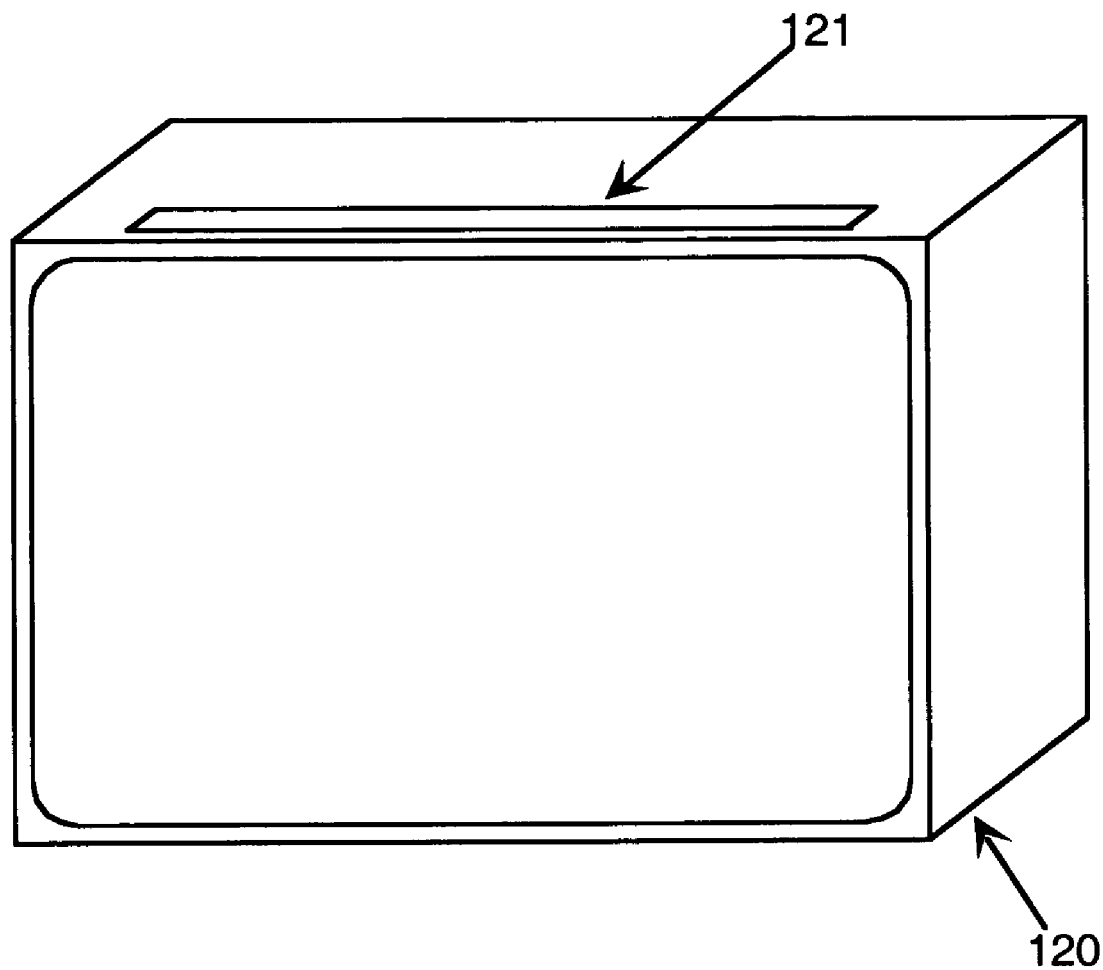
FIG. 2 shows a television receiver where a separate display unit is built in a retractable manner.
Figure 3:
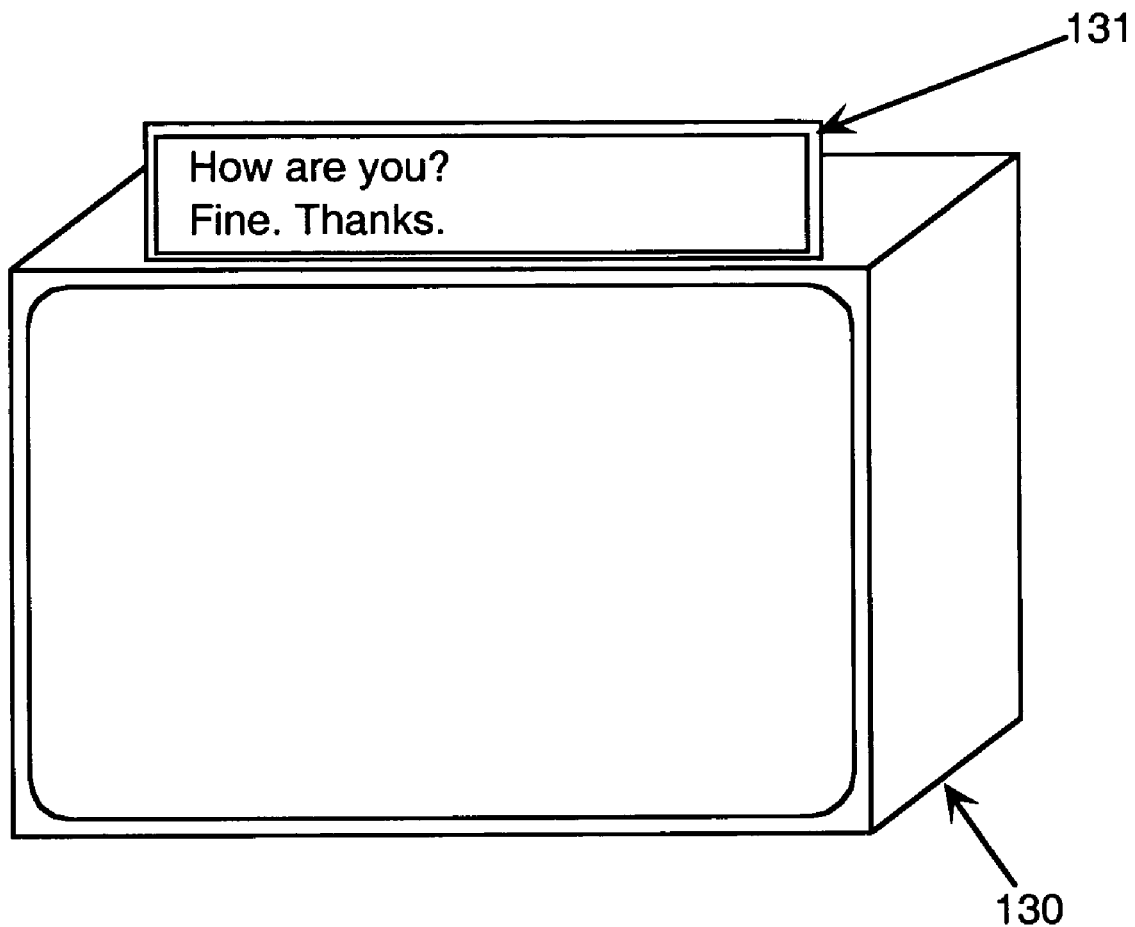
FIG. 3 shows a television receiver where a separate display unit is built in a retractable manner, when the separate display unit is in use.
Figure 4:
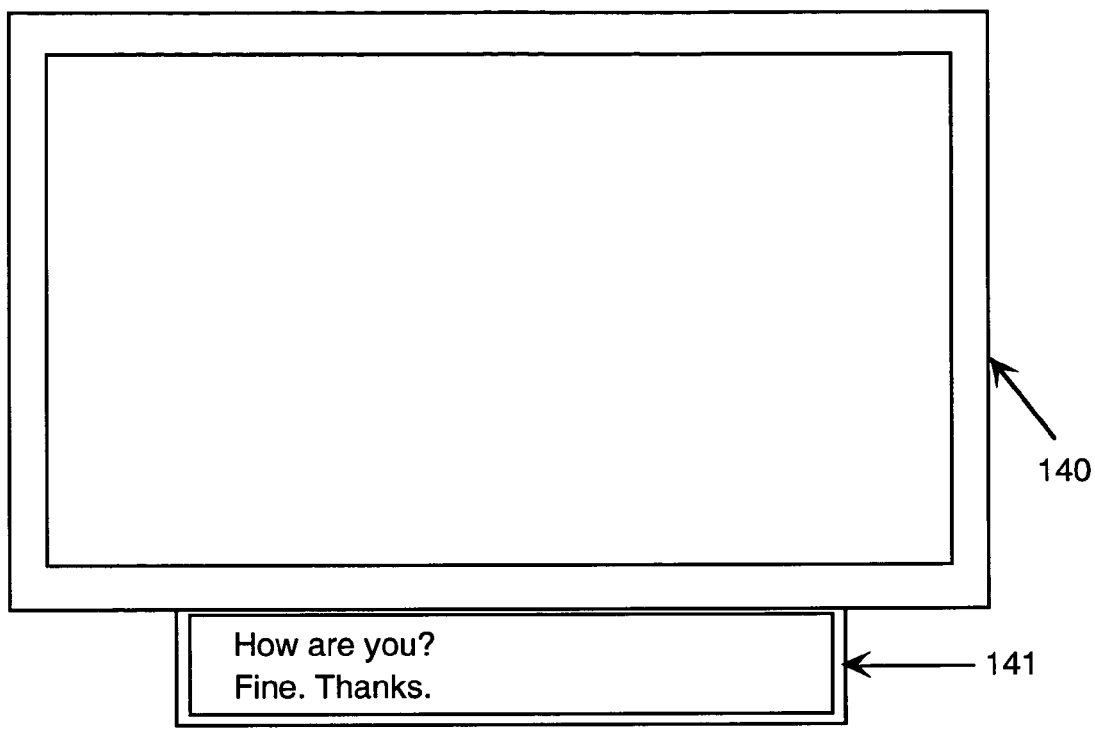
FIG. 4 shows an example of a wall-mount television receiver that has a separate display unit for textual and other visual information.
Figure 28:
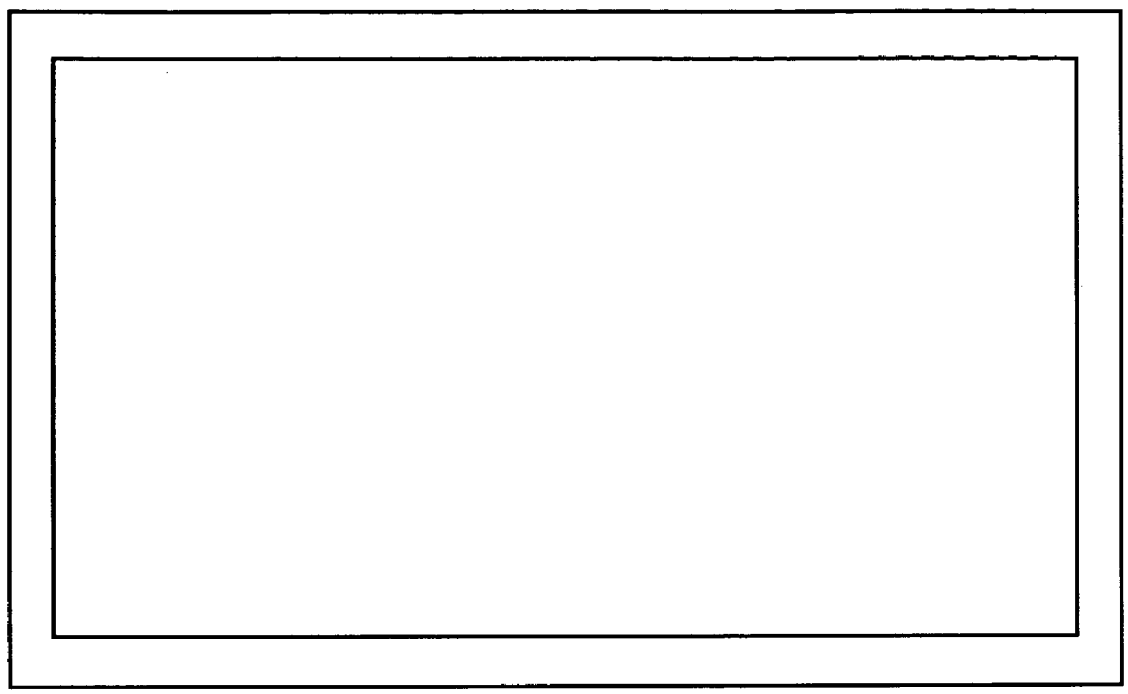
FIG. 28 shows an example of a wall-mount television receiver whose separate display unit has been retracted into the television receiver.

The separate display unit can be built into the television receiver in a retractable manner. FIGS. 2–3 show such an example. When the separate display unit is not in use, it is hidden inside the television receiver 120 (FIG. 2). When a viewer wants to display textual information in the separate display unit, the separate display unit 131 comes out from the television receiver 130 and displays the textual information (FIG. 3). Recently, some television receiver models have been designed to be hung on the wall. The teaching and idea of the present invention can be applied to such a television receiver. FIG. 4 illustrates how the wall-mount television receiver 140 with a separate display unit 141 works. In addition, the separate display unit can be designed in such a way that it is hidden inside the television receiver when it is not being used. For instance, when it is not being used, the separate display unit 141 can be retracted into the television receiver 140. As a result, the separate display unit will not be seen, as shown in FIG. 28. If it needs to be used, it comes out from the television receiver and displays textual information.

Quite often, the textual information which is to be displayed in a frame consists of several sentences. In order to avoid confusion, the television receiver usually displays these sentences on separate lines, resulting in several lines of textual information. However, due to a physical limitation, in most cases the separate display means is high enough to accommodate only 2–3 lines. In order to solve this problem, the present invention also provides the means to display the textual information using different colors. For example, the sentence of one speaker is displayed in red, while the sentence of a different speaker is displayed in blue. In this way, several sentences by different speakers can be displayed in one or two lines without causing any confusion about who is speaking.

Figure 10:
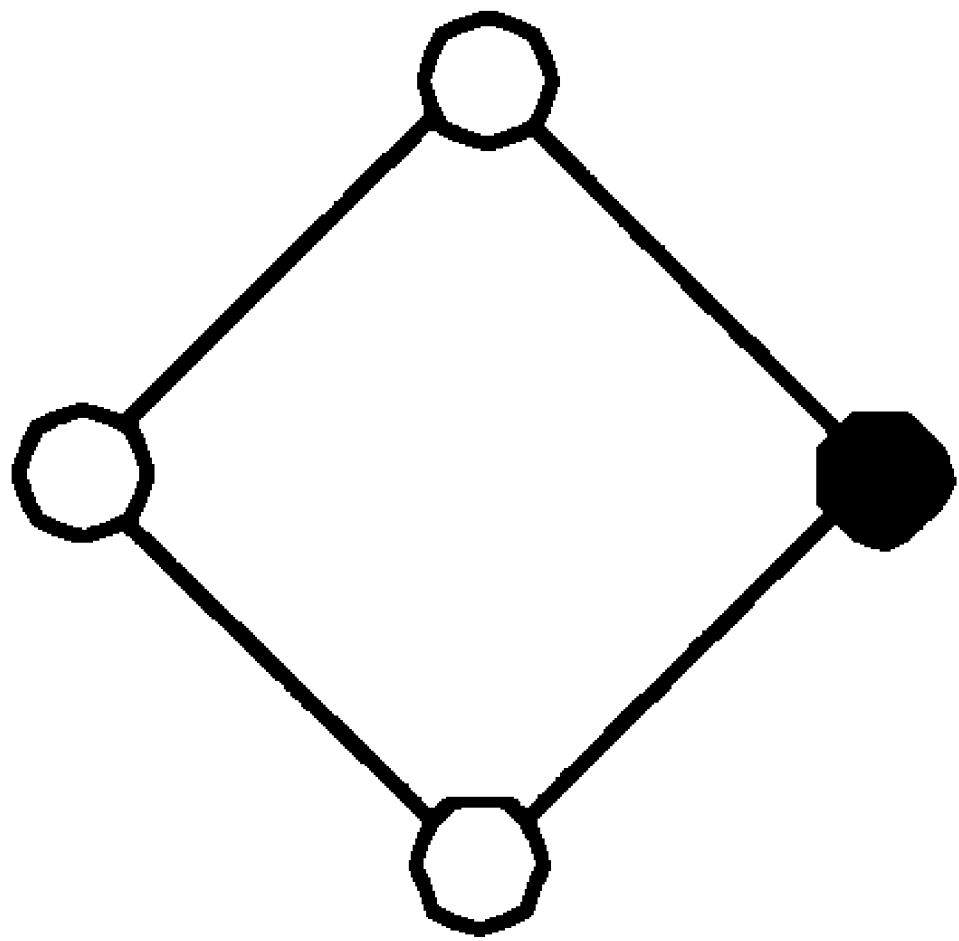
FIG. 10 shows an image that provides information on runners in a baseball game.

Although the separate display means is mainly intended for the textual information of closed caption text, translation and original text, it can also be used to display other textual and video information. For instance, the broadcasting station may display the future program schedule following the current program. From time to time, broadcasting stations display textual information at the bottom of the monitor while broadcasting a regular program. Sometimes, urgent information is displayed at the bottom of the monitor and this kind of information can be effectively displayed on the separately display means. Furthermore, when a television station broadcasts a sports game, the television station can use the separate display unit to display scores and other information about the game. Sometimes, information on a game can be better displayed using images. For instance, when a station broadcasts a baseball game, the information on runners can be effectively displayed using an image, as shown in FIG. 10. This image can be transmitted to the separate display means as bitmap. These kinds of auxiliary textual and visual information can be effectively displayed on the separate display means.

Figure 27:
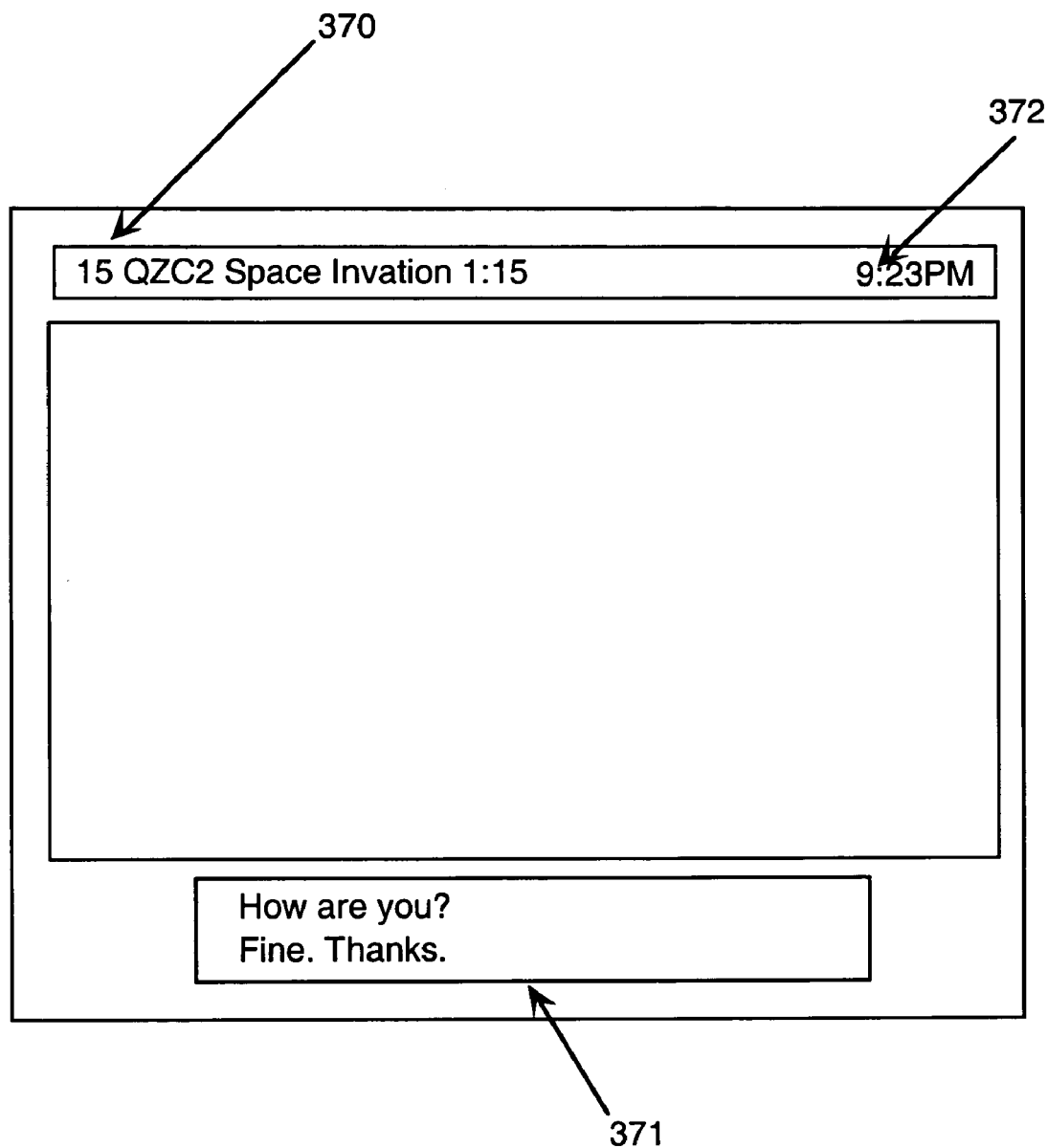
FIG. 27 shows an example of a television receiver that has two separate display units, one of which displays auxiliary information, including the channel number, the station name, the title of the program, the remaining time and the current time.

Sometimes, a broadcasting station transmits information on the program that it is currently broadcasting since a viewer, who tunes in during the middle of the program, may not know the title of the program. In particular, if the program is long, such as a movie, it would be very helpful if the station could provide information on the program for viewers who tune in during the middle of the program. Usually, broadcasters transmit information about a program that is currently being broadcast at the end of commercial advertisements. Alternatively, a broadcaster may display textual information about the program in a corner of the picture from time to time. With a separate display unit available, broadcasters can display such information on the program that is currently being broadcast in the separate display unit. For instance, the separate display means can be used to display the station name, the title of the current program, and the remaining time of the current program. The broadcasting station may display the program information on the separate display unit when it is not being used for some other purpose. If the television receiver has multiple separate display units, this kind of information can be more effectively displayed. For instance, in FIG. 27 the television receiver has two separate display units 370, 371. On the upper separate display unit 370, the television receiver displays the channel number (15), the station name (QZC2), the title of the program (Space Invasion), and the remaining time of the program (1:15), while the lower separate display unit 371 displays subtitles of the program. In addition, the current local time (9:23 PM) 372 is also displayed. Furthermore, with digital television broadcasting, data broadcasting is also possible and some of these data can be displayed in the separate display unit.

Figure 11:
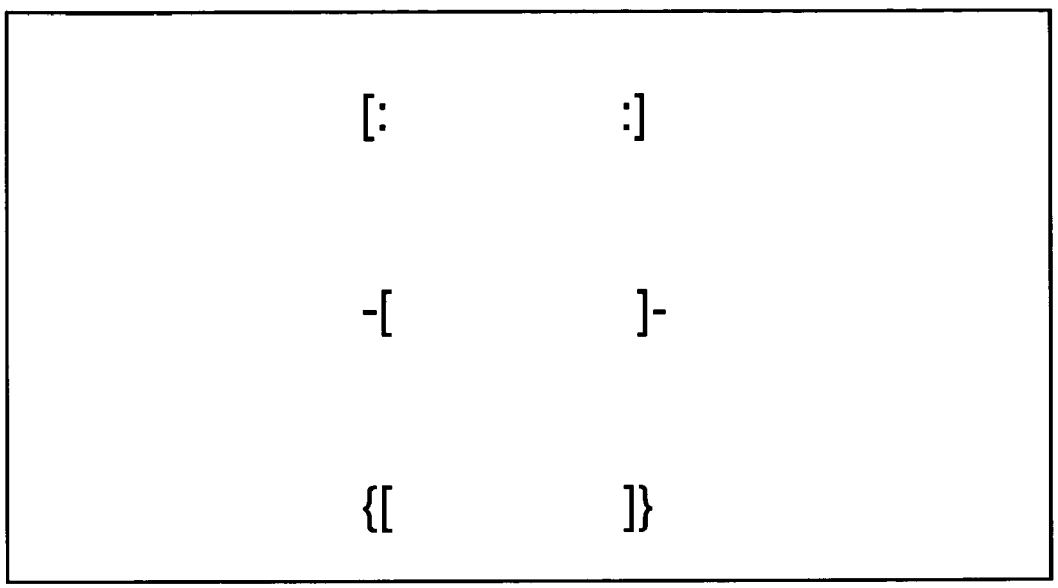
FIG. 11 shows examples of special characters which indicate that strings between the special characters are auxiliary information.

When a station needs to display such auxiliary textual information, it should be transmitted in such a way that a television receiver can distinguish them. For example, the television receiver should be able to determine whether signals for textual information are subtitles or the title of the program. If textual information is transmitted as closed caption text, the auxiliary information may be transmitted between some special characters. FIG. 11 shows some examples of such characters.

With the separate display means available, the broadcasting station may choose to display these kinds of textual information in the separate display means. However, if the separate display means is already being used, the television receiver needs to display the textual information sent by the broadcasting station in such a way that the viewer can distinguish among the various kinds of information. For example, they can be displayed on a different line or displayed using different colors. If the television receiver has multiple separate display units, it can display them on different display units.

Figure 25:
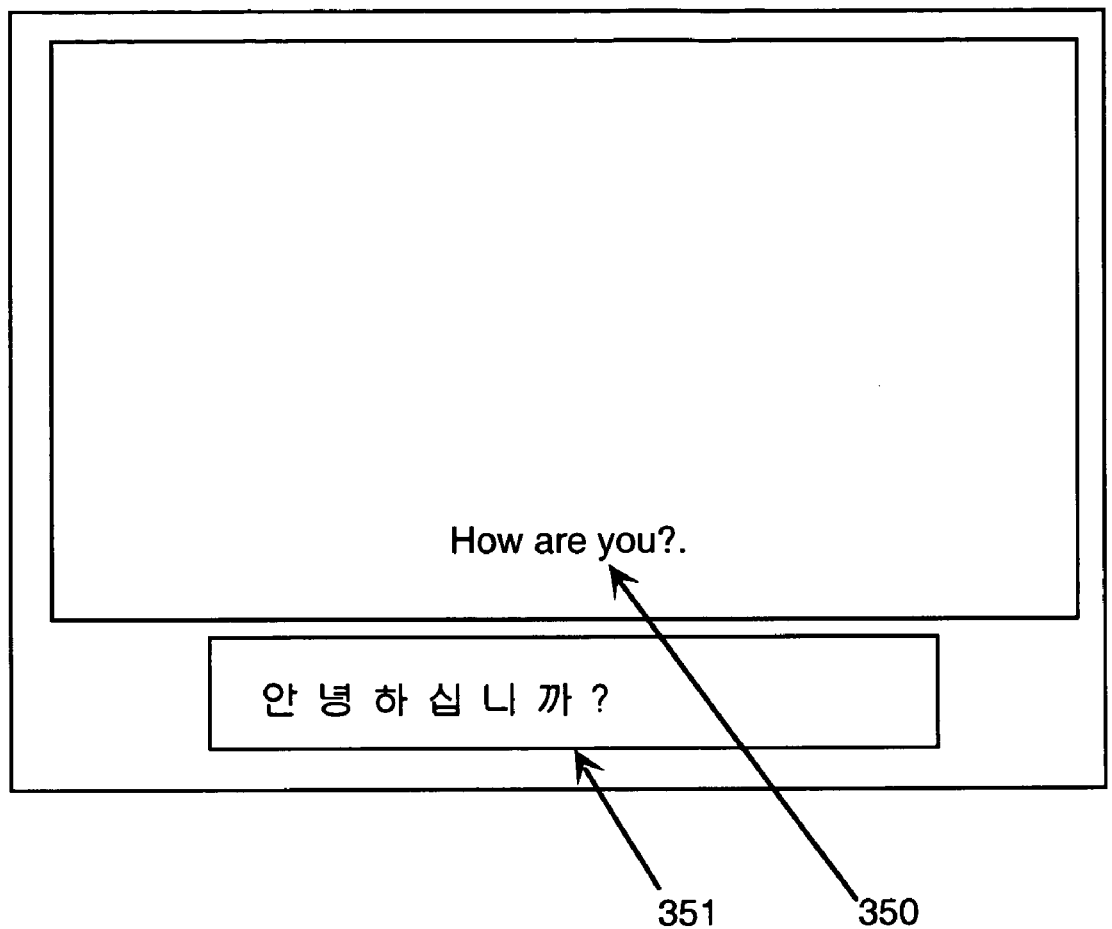
FIG. 25 shows an example of how subtitles in the original language are displayed on the picture area, while other subtitles in a different language are displayed on the separate display means.
Figure 26:
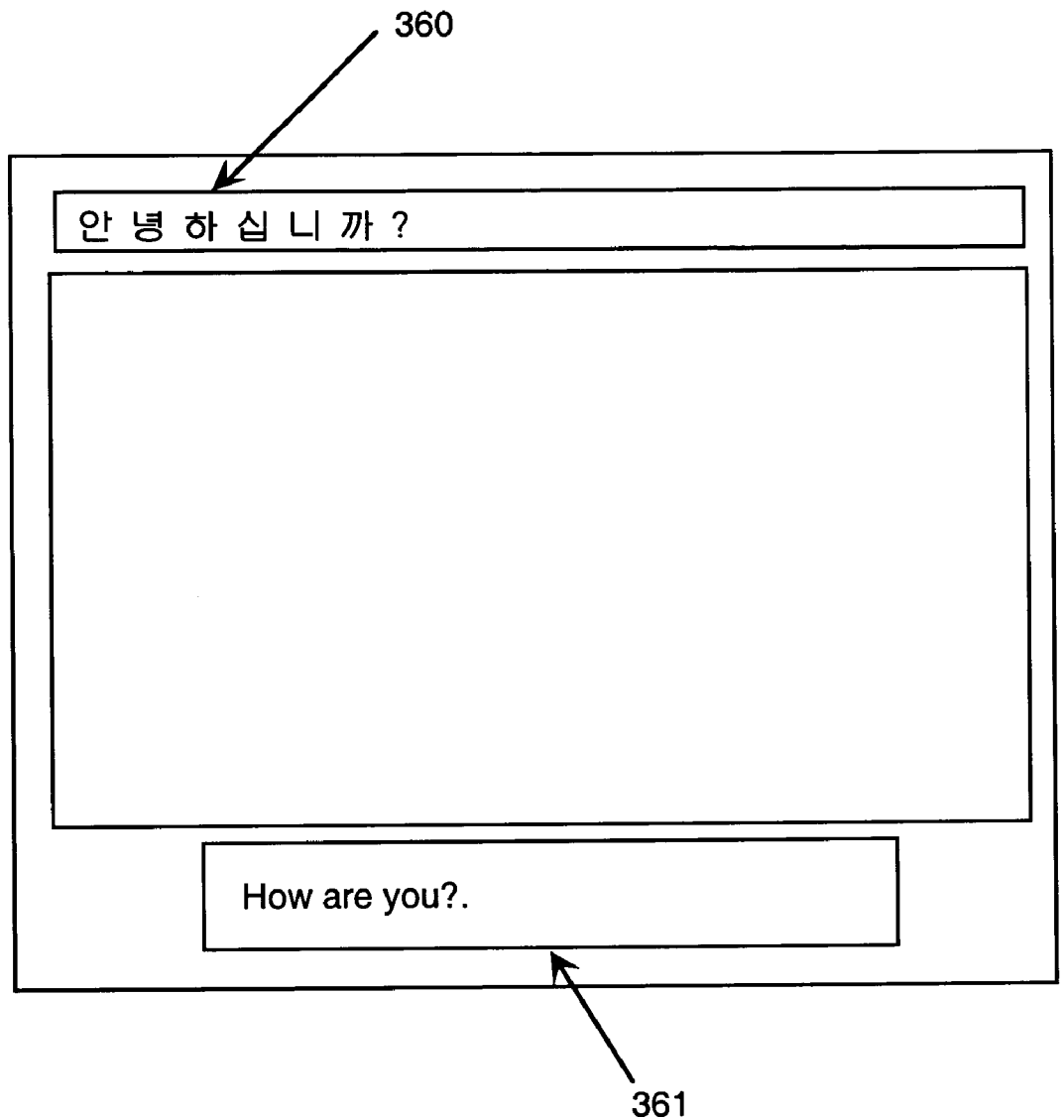
FIG. 26 shows an example of how subtitles in the original language are displayed on the upper separate display means, while other subtitles in a different language are displayed on the lower separate display means.

Furthermore, with the separate display means available, a viewer can display subtitles in several languages simultaneously. For instance, the viewer can display subtitles 350 in the original language on the screen and other subtitles 351 in the viewer's own language on a different separate display unit, as shown in FIG. 25. If the television receiver has multiple separate display units, they can be used to display subtitles in several languages on different separate display units. For instance, a viewer can display subtitles in the original language on one separate display unit 361 and another subtitle in the viewer's own language on a different separate display unit 360, as shown in FIG. 26.

Embodiment 2

Figure 12:
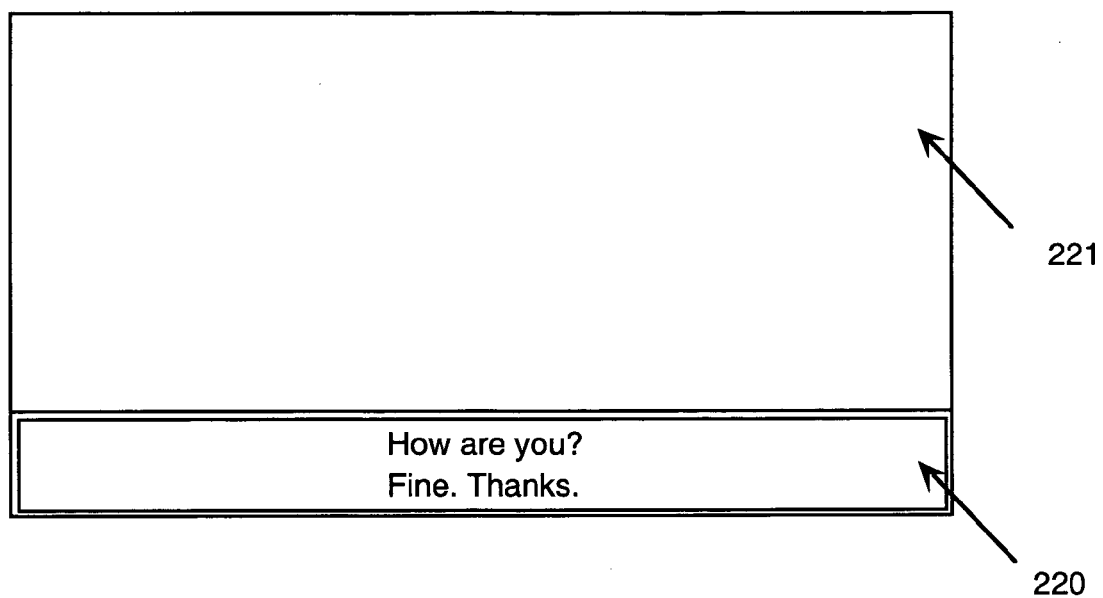
FIG. 12 shows an example of a movie theater display apparatus, which has a separate display means located below the screen.
Figure 13:
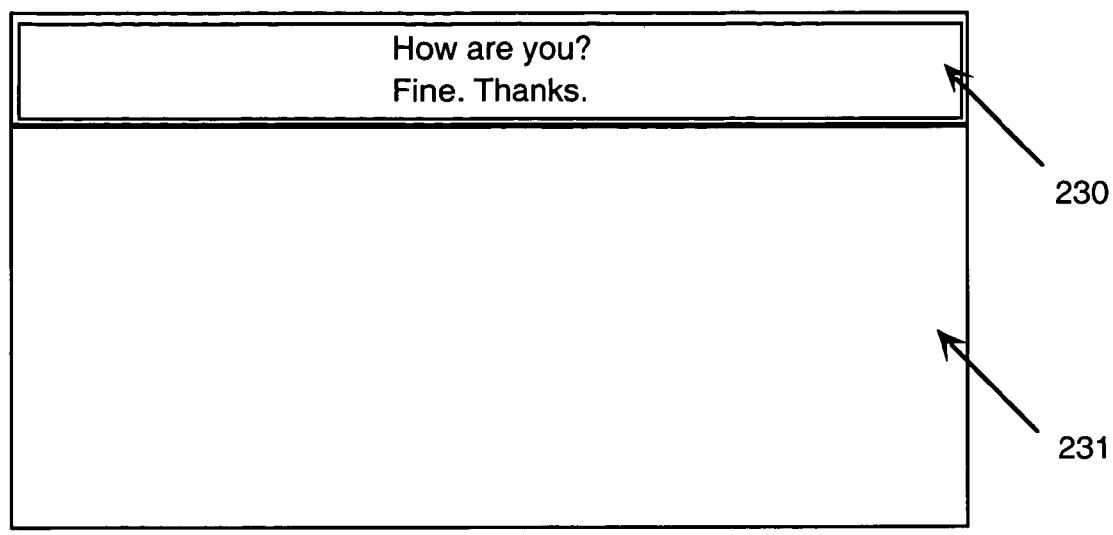
FIG. 13 shows an example of a movie theater display apparatus, which has a separate display means located above the screen.
Figure 14:
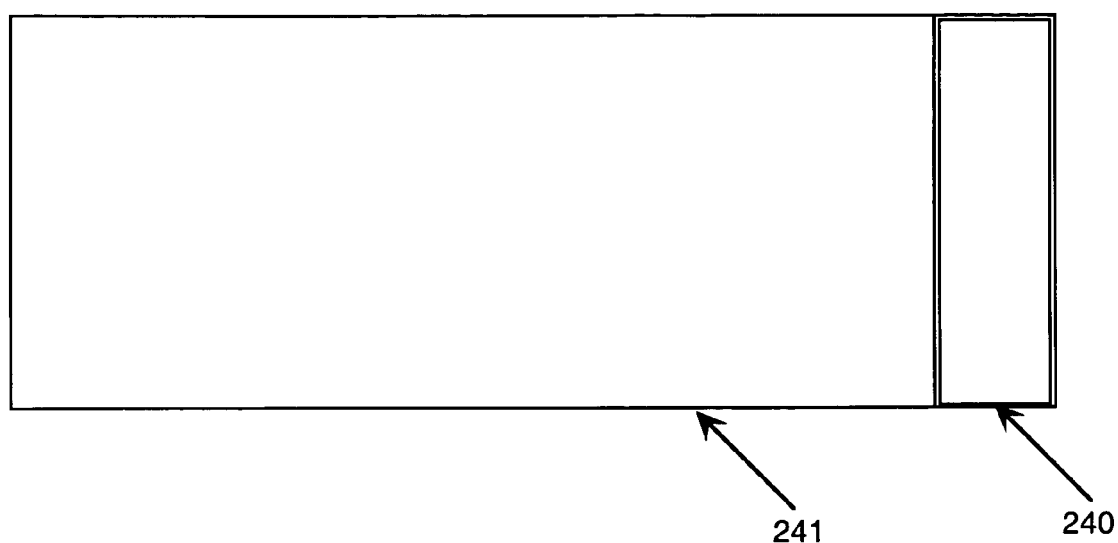
FIG. 14 shows an example of a movie theater display apparatus, which has a vertical separate display means located on the right side.
Figure 15:
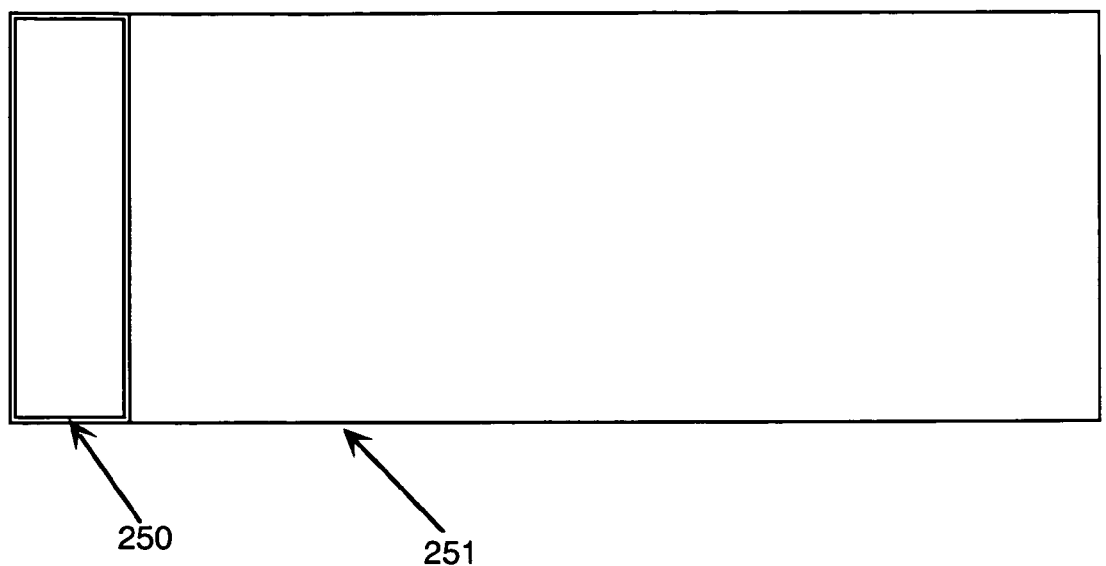
FIG. 15 shows an example of a movie theater display apparatus, which has a vertical separate display means located on the left side.

When a foreign movie is shown in a cinema, usually the translation is also shown on the screen. Typically, the translation is directly written onto the film. As with the television receiver, this translation blocks a substantial portion of the screen, thereby preventing viewers from watching the full picture. The teaching and idea of the present invention can be also applied to this case. According to the teaching of the present invention, the movie theater installs a separate display unit 220 as illustrated in FIG. 12 and displays the textual translation in the separate display means 220. As in the case of television receiver, the location of the separate display means may be anywhere outside of the video display area 221. In FIG. 12, the separate display unit 220 is located below the screen 221. The separate display unit 230 can also be placed above the screen 231 (FIG. 13). Some languages can be written vertically. In such cases, the separate display 240 can be positioned vertically to the right of the screen 241 (FIG. 14). Alternatively, the separate display 250 can be positioned vertically to the left of the screen 251 (FIG. 15).

Figure 16:
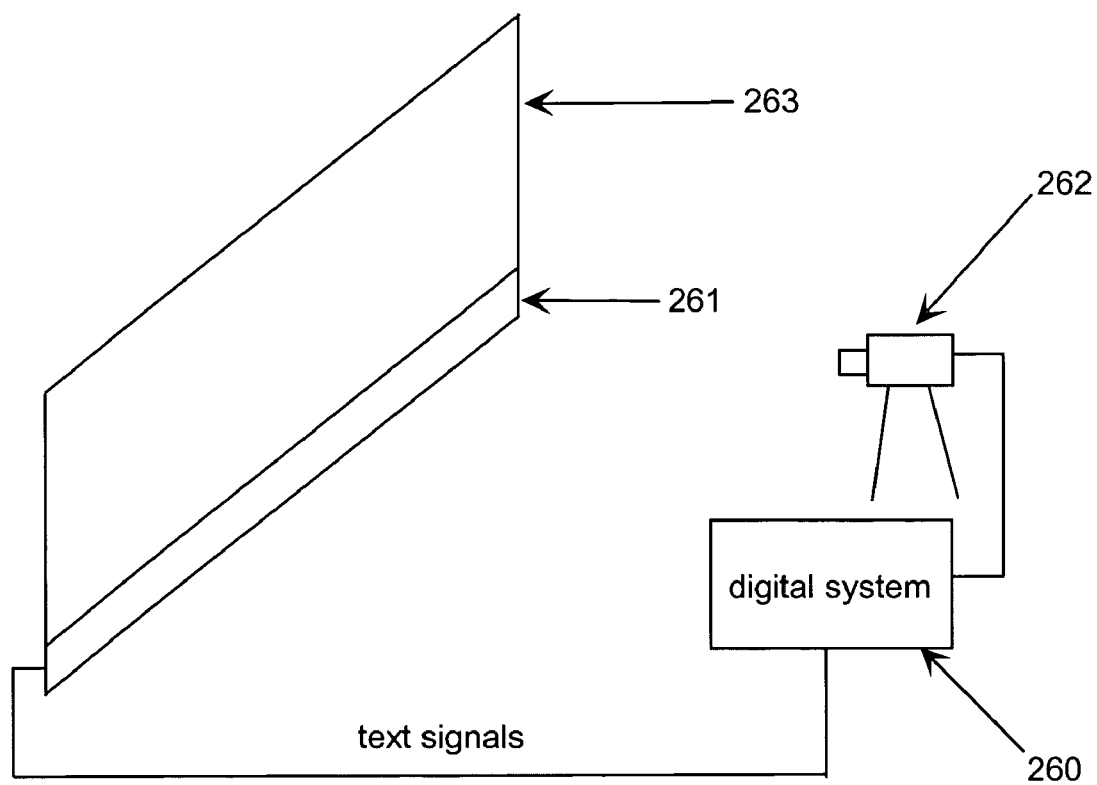
FIG. 16 illustrates how text signals are transmitted to the separate display unit in the movie theater.
Figure 17:
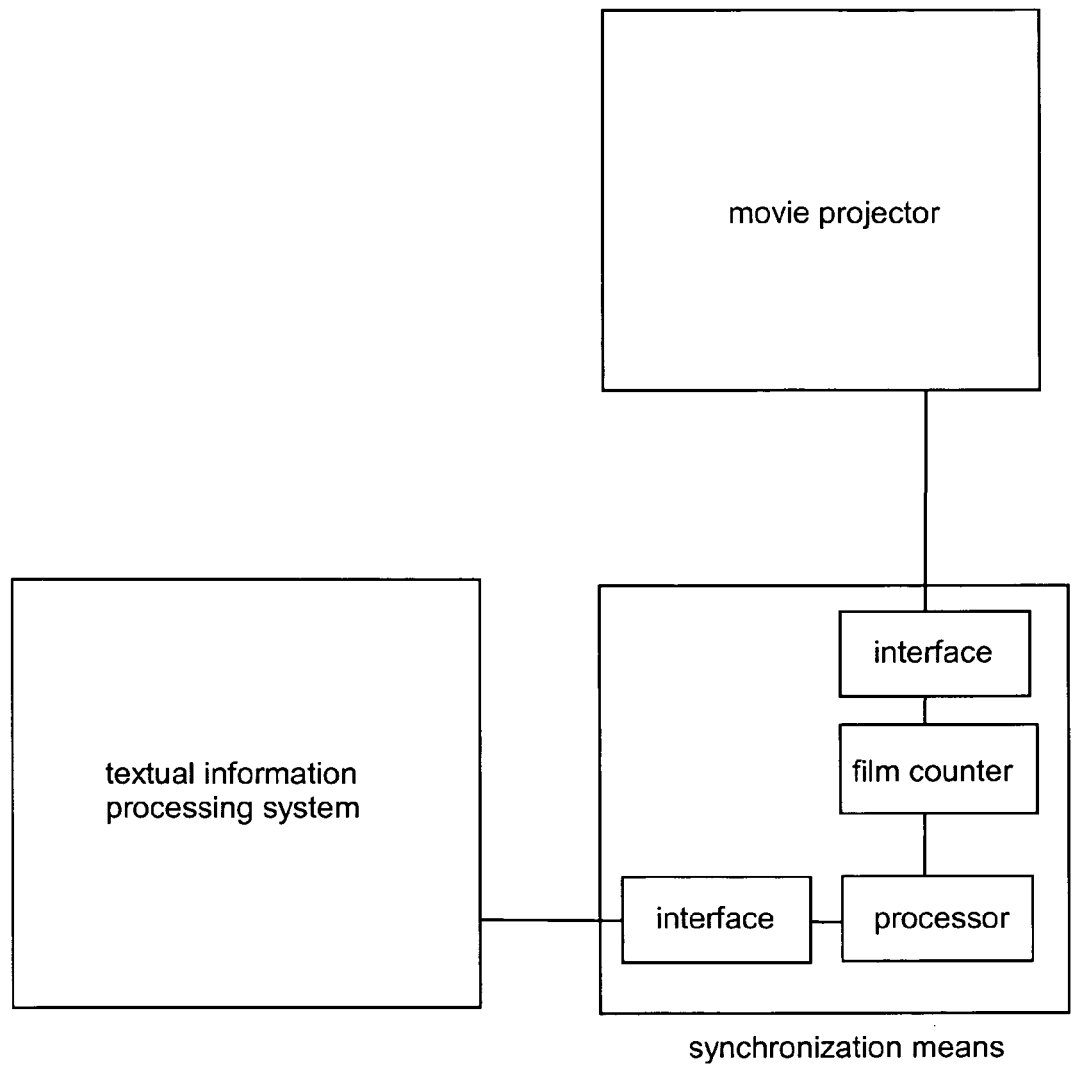
FIG. 17 shows a block-diagram of the synchronization means.

Since most movies shown in a cinema are recorded on analog films, typically the textual translation is written directly onto the film. Generally, it is difficult to separate this textual information from the film. Although one may use OCR (optical character recognition) techniques to extract the textual information, it is difficult. Moreover, once the subtitle is written on the film, parts of the picture signals are permanently lost. A possible solution is to record the textual translation on digital media and then send the digital data to the separate display unit in synchronization with the movie. FIG. 16 shows an exemplary system configuration when a separate system 260 is used to store the textual translation and send the textual information to the separate display unit 261. There are the analog film projector 262 that projects videos onto the screen 263 and the digital system 260 which sends the textual information to the separate display unit 261. If the playing speeds of the analog film projector 262 and the digital system 260 are exactly the same, then the speech in the movie and the textual translation will match exactly. However, if the playing speed of any one of the two players varies, it will result in a mismatch between the speech and text translation. In order to address this problem, synchronization means is also required. FIG. 17 shows a block-diagram of such synchronization means.

Figure 18:
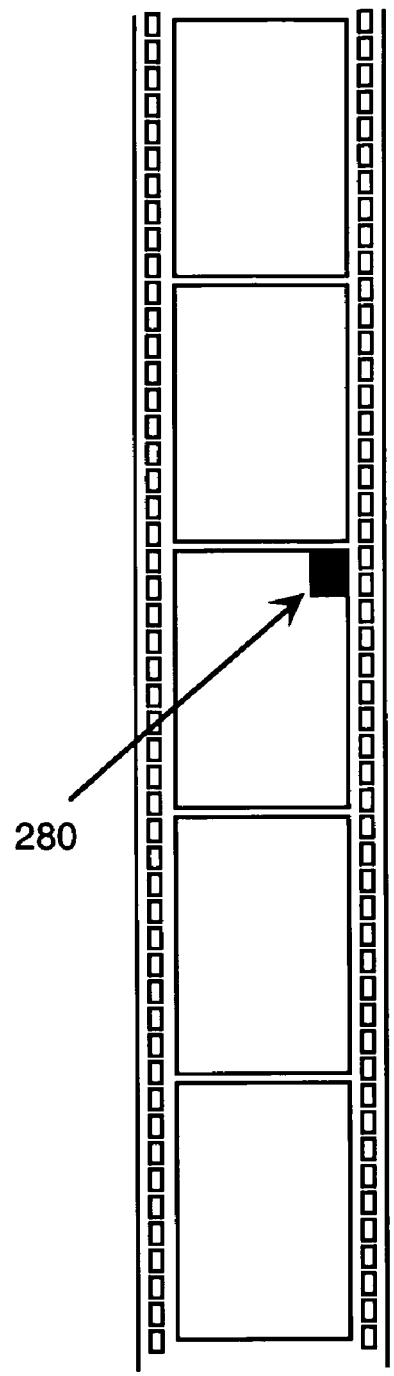
FIG. 18 shows how special markers can be put into the analog film as a synchronization means.
Figure 19:
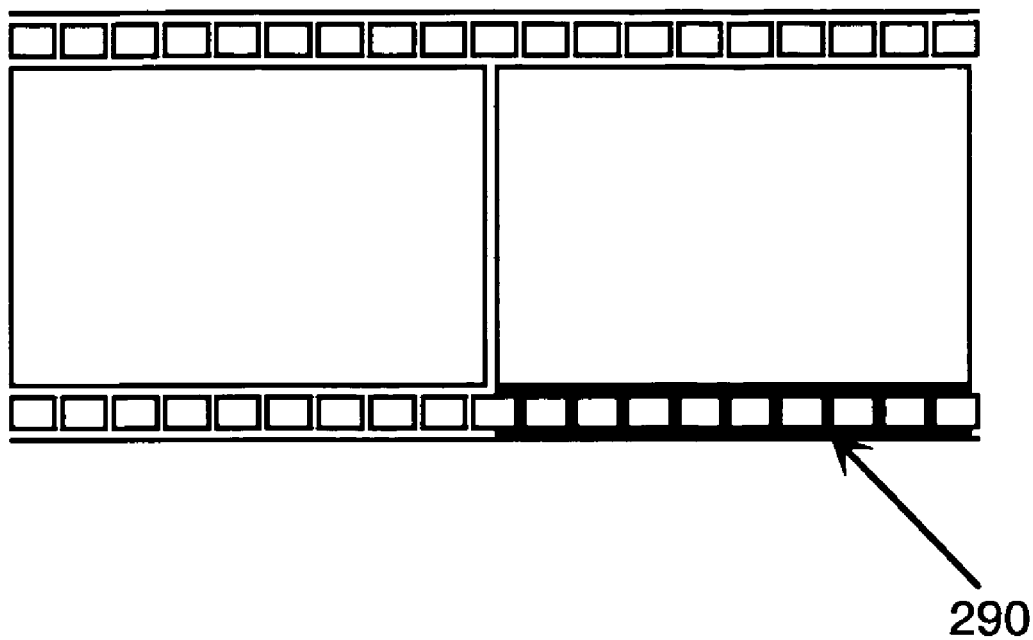
FIG. 19 shows another example of special markers that are put into the analog film as a synchronization means.

One possible way to implement synchronization means is to put a special marker on the analog film. Typically, over 30 frames are played per second in most movies. Even if one of the frames has a special marker 280 as shown in FIG. 18, the human eye cannot usually notice it. For example, in FIG. 18, the marker has a rectangular shape with a mono color and is located in the lower right corner. One can choose the shape and color of the marker 280 so that it will be easily detectable later. Thus, one can place a number of such special markers throughout the film and use the markers for synchronization. In order to detect the marker, each frame is digitized using a picture capture and a processor checks the lower right corner. The marker can be easily detected if the marker has a special shape and color. It is very unlikely that movies would include frames that accidentally have the same marker. It is also possible to put other markers 290 to films as shown in FIG. 19. Another possible way to implement synchronization means is to use a film counter that counts film frames. In this case, the digital system 260 of FIG. 16 reads the film counter and sends the textual information to the separate display unit 261 in a synchronous manner.

Figure 20:
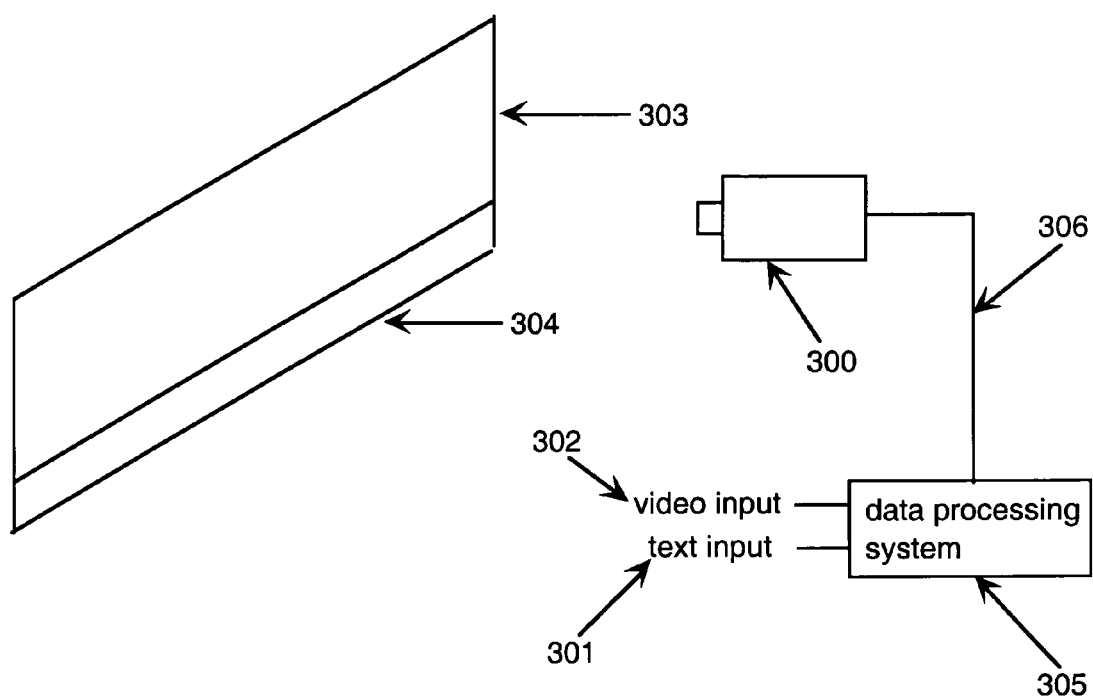
FIG. 20 illustrates how videos and text can be displayed on the screen using a single projector.
Figure 21:
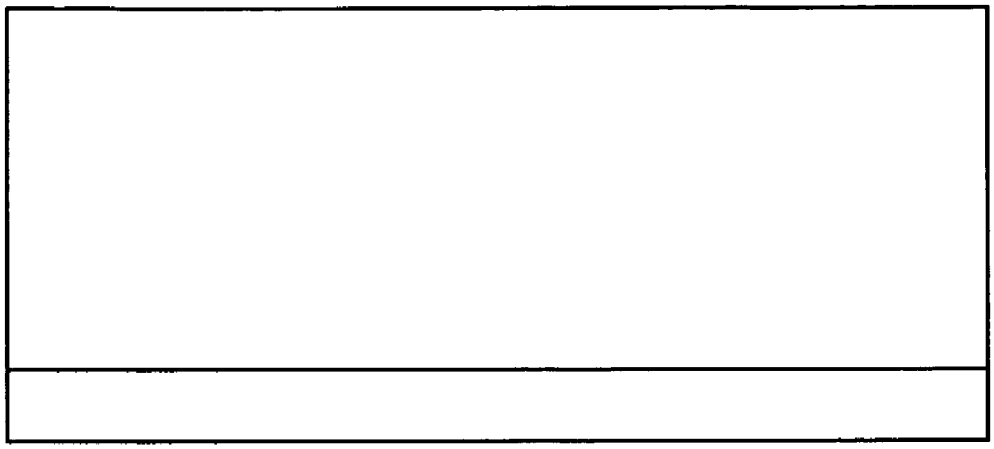
FIG. 21 shows examples of screens that can display both videos and text.
Figure 21:
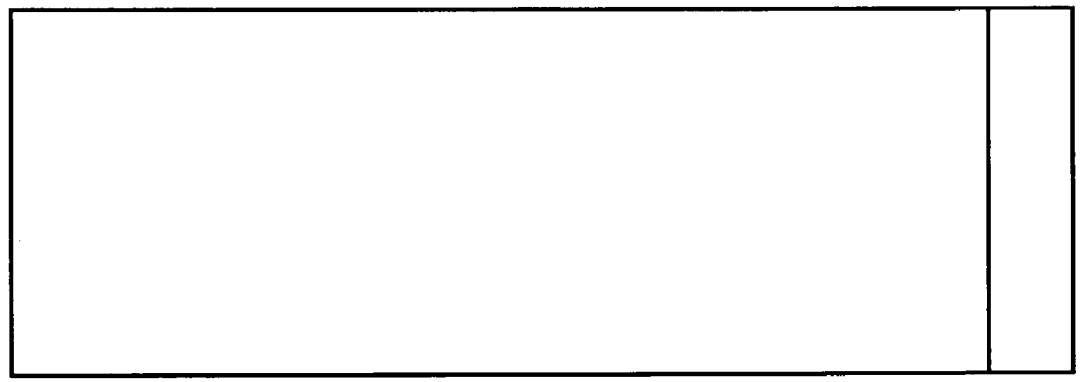
Figure 21:
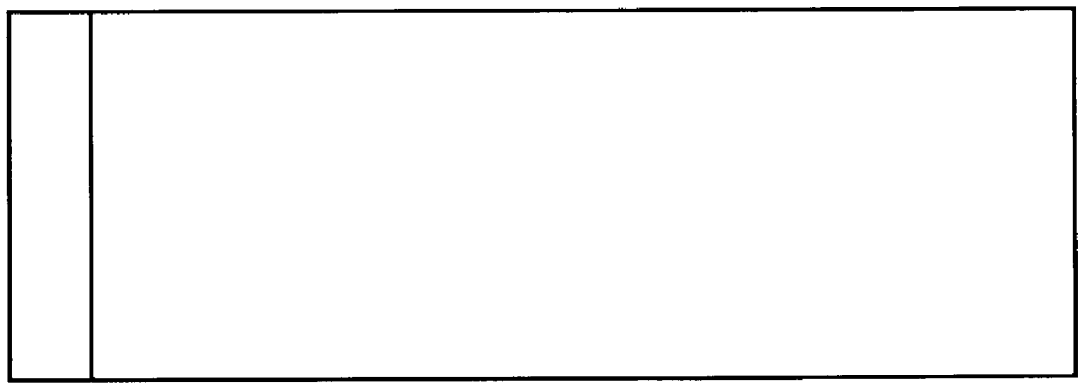

As technology advances, it is expected that in the future, movies will be stored and distributed in digital formats. In such digital cinema as shown in FIG. 20, a new type of projector 300, such as an LCD (liquid crystal display) projector, can be used. In this case, the data processing system 305 takes both video data 302 and text data 301 and produces video signals for the LCD projector. The video signals are transmitted to the LCD projector through a cable 306. In particular, the data processing system 305 arranges video and text data such that the video data is displayed on the video part 303 of the screen and the text data on the text part 304 of the screen. In this case, the movie theater need not install a separate display unit. It needs to make the screen larger so that it can display video and textual information together. FIG. 21 illustrates various examples of such screens.

Embodiment 3

Recently, DVD has become a popular medium for recording videos. DVD has many advantages over videocassettes, such as VHS. One of the advantages of DVD is that a user can choose whether to display subtitles or not. Furthermore, the subtitles are provided in several languages. Thus, a user can choose the language they want to display. Typically, a DVD player decodes videos and subtitle images, and then combines them to form a new video signal. Then, the DVD player sends it to a display apparatus such as a television receiver. Since the present invention requires videos and text images to be separated for the text to be displayed in the separate display unit, the DVD player should combine the two signals in such a way that they can be separated later.

Figure 22:
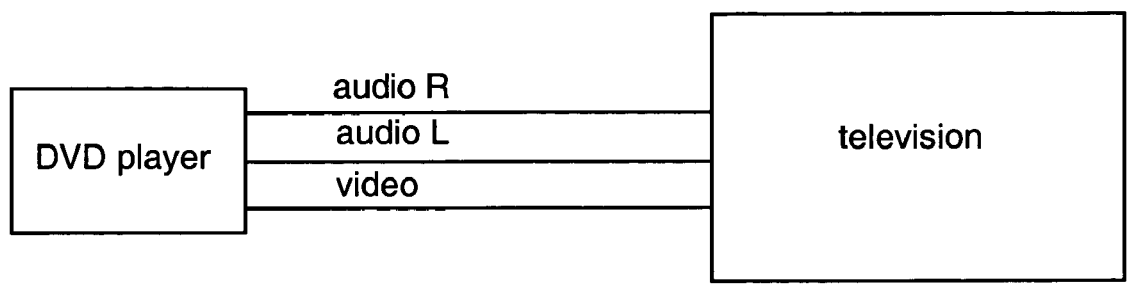
FIG. 22 illustrates the connection cables between a DVD player and a television receiver.
Figure 23:
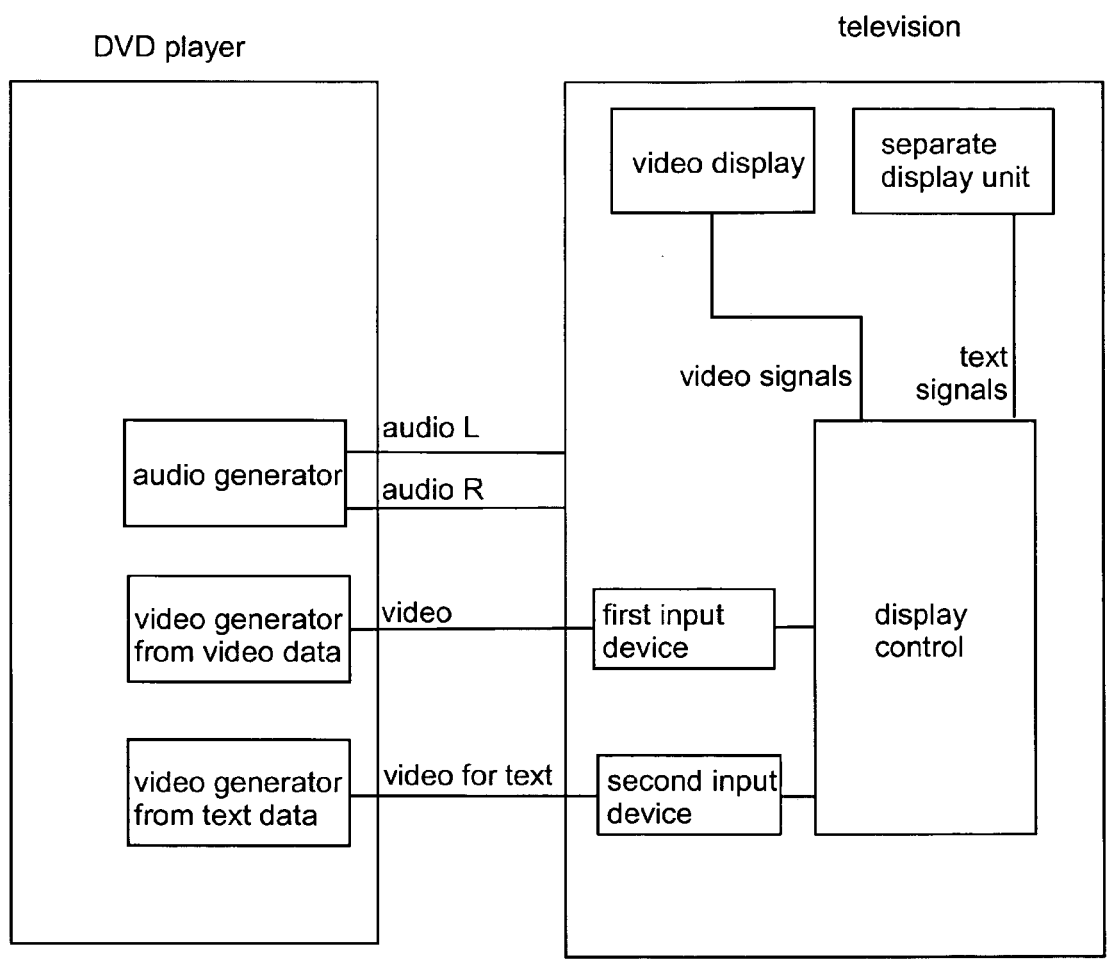
FIG. 23 shows another example of the connection cables between a DVD player and a television receiver.

FIG. 22 shows a typical connection scheme between a DVD player and a television receiver. There are connections for video and audio signals. Since DVD provides multichannel audio, several cables are required for audio signals. Thus, most DVD players have digital out for multichannel audio. In order to display text information in the separate display unit, the DVD player may use a different video connection, as shown in FIG. 23, to send subtitle images to a television receiver. Alternatively, one can use a video cable that can carry multiple video signals.

Figure 24:
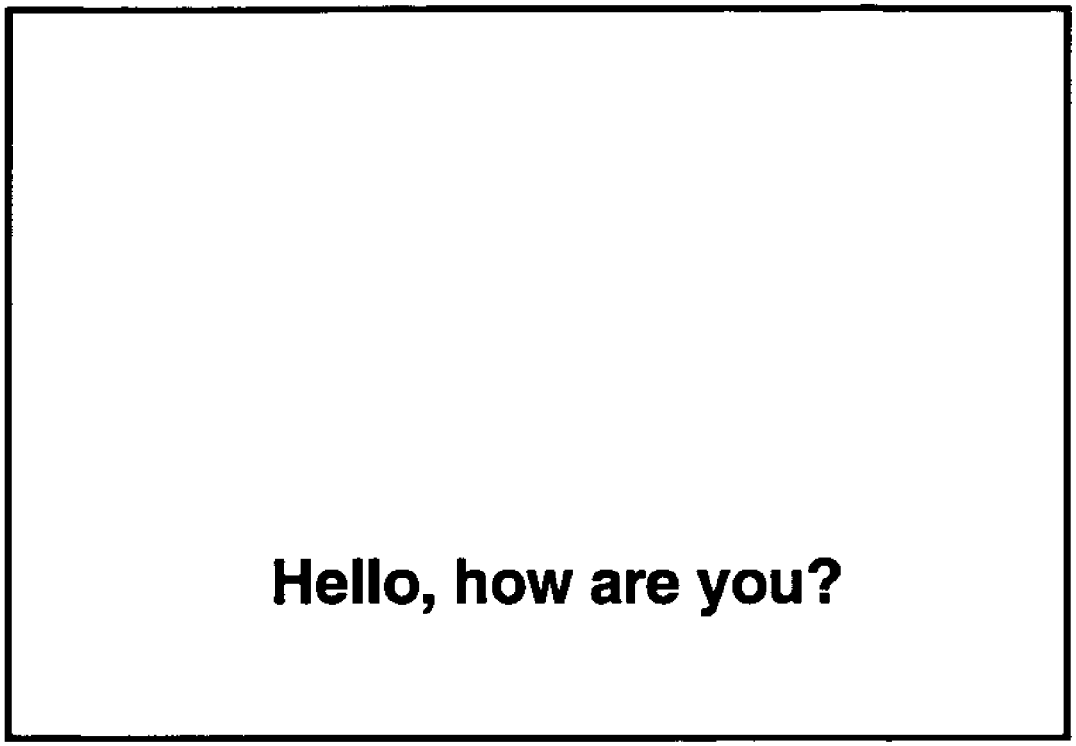
FIG. 24 shows an example of a text image in DVD.

Typically, the text area, which is a part of the subtitle image, can be easily extracted. FIG. 24 shows an example of the subtitle image. The DVD player can send subtitle images to the television receiver and the television receiver extracts the area that contains the text and displays the text on the separate display means. Alternatively, the DVD player may extract the area that contains the text and send the data for the text area to the television receiver. In either case, the data can be sent to the television receiver as either bitmap or video signals. Regardless of whether the data are be sent to the television receiver as bitmap or video signals, there should be a certain protocol so that the text can be displayed properly on the separate display means.

Figure 30:
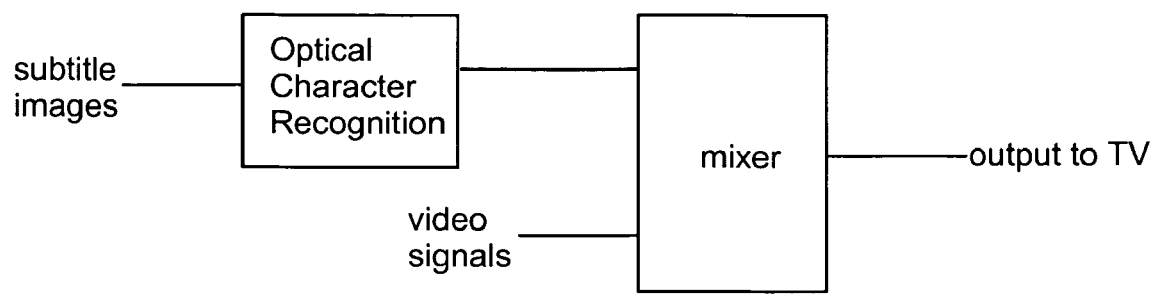
FIG. 30 illustrates how subtitle images are converted into characters and mixed with video signals.

Another possible solution is to mix the textual information with video signals in such a way that they can be separated later. For example, one can first apply an optical character recognision (OCR) technique to subtitle images to extract textual information (FIG. 30). Once the textual information is recognized, it can easily be mixed with the video signals in such a way that they can be separated later. One such technique is closed caption text. Thus, after the textual information is recognized, the DVD player mixes the textual information with the video signals in the format of closed caption text. Then the television receiver can display the textual information, which is transmitted as closed caption text, on the separate display unit. Although this solution does not need an additional video cable as in the previous case, the DVD player needs to have an OCR algorithm. Fortunately, many producers are producing DVDs that already contain closed caption text in addition to subtitle images. In other words, such DVDs have both subtitle images and closed caption text for textual information. In this case, it is easy for a DVD player to send textual information to a television receiver, so that the television receiver can easily separate the textual information and display it on the separate display unit.

Embodiment 4

The broadcasting station utilizes the separate display means to display various kinds of information about programs. First of all, the broadcasting station transmits information on the current program for those viewers who tune in during the middle of the program. With a separate display unit available, the broadcaster can display information on the program that is currently broadcast in the separate display unit. For instance, the broadcasting station can display the station name, the title of the current program, and the remaining time of the current program. These kinds of auxiliary information can be transmitted whenever the bandwidth is available. The broadcasting station may display the program information on the separate display unit when it is not being used for other purpose. However, if the separate display unit is already being used and the broadcasting station tries to display other textual information, then the television receiver needs to display the various kinds of textual information sent by the broadcasting station in such a way that the viewer can distinguish among them. For example, they can be displayed on different lines or by using different colors. Furthermore, when a station needs to display these kinds of auxiliary textual information, they should be transmitted in such a way that a television receiver can distinguish them from subtitles. In other words, the television receiver should be able to determine whether signals for textual information are subtitles or auxiliary information. If textual information is transmitted as closed caption text, the auxiliary information may be transmitted between some special characters during the time when subtitles in closed caption text are not being transmitted. FIG. 1 shows some examples of such special characters.

If the television receiver has multiple separate display units, these kinds of information can be more effectively displayed. For instance, in FIG. 27 the television receiver has two separate display units 370, 371. On the upper separate display unit 370, the television receiver displays the channel number (15), the station name (QZC2), the title of the program (Space Invasion), and the remaining time of the program (1:15), while the lower separate display unit 371 display subtitle of the program. In addition, the current local time (9:23 PM) 372 is also displayed. Furthermore, with digital television broadcasting, data broadcasting is also possible and some of these data can be displayed in the separate display unit.

The television receiver may store some of these kinds of auxiliary information and display them later. For instance, the television receiver can store the station names of channels and display them whenever the viewer changes channels. If the television receiver has already the information on the current program of a channel, such as the title and remaining time of the program, the television receiver can display them whenever the viewer tunes into the channel.

What is claimed is:

1. A video display apparatus that has separate display means for textual and other visual information, comprising:
   input means that receives input signals that comprise video signals, audio signals, and text signals;
   video display means for videos;
   retractable separate display means for textual information and other visual information, which is hidden when said retractable separate display means is not in use; and
   display control means that extracts said video signals and said text signals from said input signals, and sends said video signals to said video display means and said textual signals to said separate display means.

2. The video display apparatus in accordance with claim 1, wherein said retractable separate display means uses different text colors for different speakers.

3. A cinema display apparatus, comprising:
   video display means;
   separate display means for textual information and other visual information which is located on the outer perimeter of said video display means;
   a film projector that projects videos on said video display means;
   a textual information processing means that transmits text signals to said separate display means in synchronization with said videos; and
   synchronization means which comprises a film counter and interfacing means that sends film counter information to said textual information processing means.

4. A cinema display apparatus, comprising:
   video display means;
   retractable separate display means for textual information and other visual information which is located on the outer perimeter of said video display means and hidden when said retractable separate display means is not in use;
   a film projector that projects videos on said video display means;
   a textual information processing means that transmits text signals to said separate display means in synchronization with said videos; and
   synchronization means which comprises a film counter and interfacing means that sends film counter information to said textual information processing means.

5. A video display apparatus that has separate display means for textual and other visual information, comprising:
   video display means for moving pictures;
   separate display means for textual information and other visual information which uses different text colors for different speakers;
   first video input means that receives input first video signals which are generated from video data;
   second video input means that receives second video signals which are generated from textual data; and
   display control means that displays said first video signals to said video display means and said second video signals to said separate display means.

* * * * *